Dec. 22, 1925.  
W. L. HIGGINS  
FLUID REGULATOR  
Filed July 7, 1922
1,566,599
2 Sheets-Sheet 2
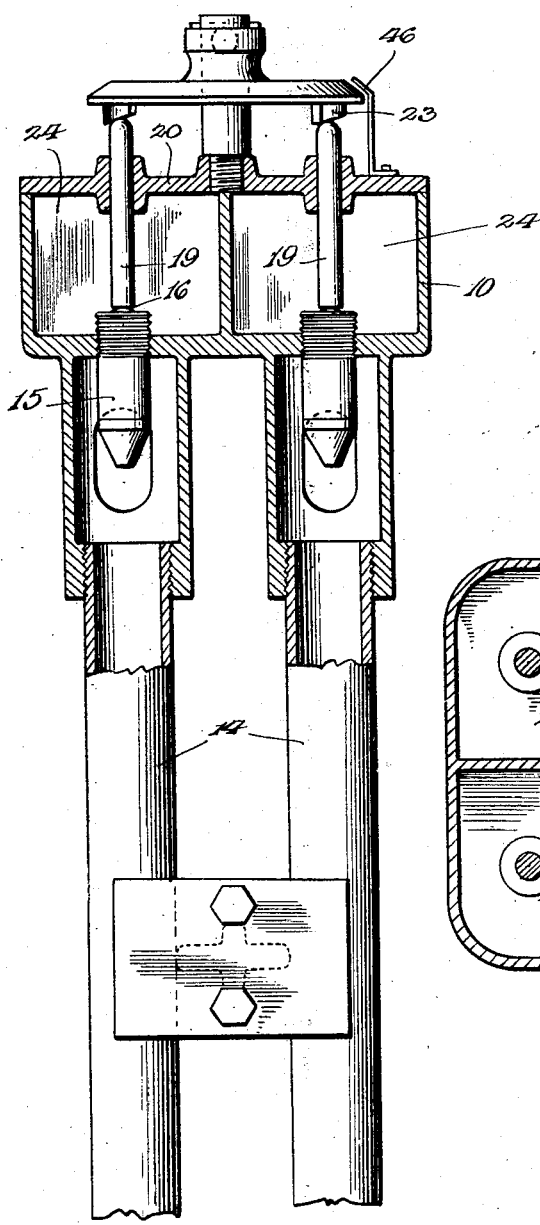
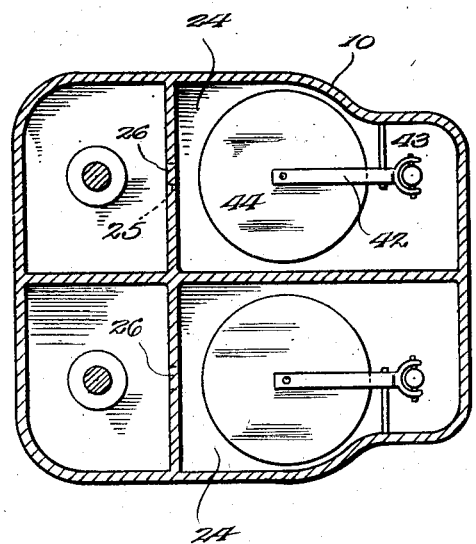

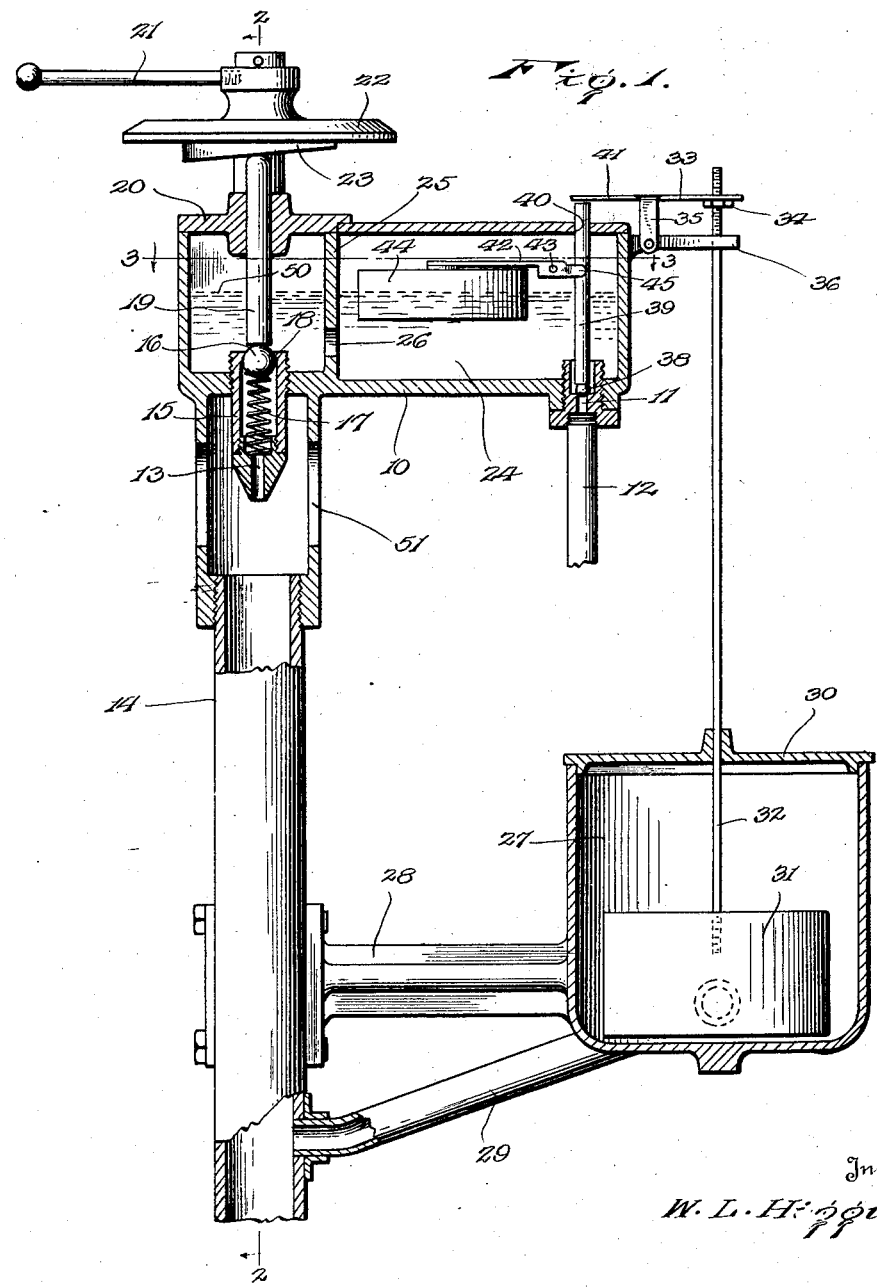

Patented Dec. 22, 1925.

1,566,599

UNITED STATES PATENT OFFICE.

WILLIAM L. HIGGINS, OF BUFFALO, NEW YORK.

FLUID REGULATOR.

Application filed July 7, 1922. Serial No. 573,261.

*To all whom it may concern:*

Be it known that I, WILLIAM L. HIGGINS, a citizen of the United States, residing at Buffalo, in the county of Erie and State of New York, have invented certain new and useful Improvements in Fluid Regulators, of which the following is a specification.

My invention relates to a device for the control and regulation of the supply of one or more fluids and one object of the invention is to provide a device with automatic means for limiting the fluid supply to a certain predetermined amount which cannot be exceeded.

Another object is to provide other automatically operating means for stopping the fluid supply in case the fluid consumption falls short of a predetermined amount.

Still another object of the present invention is to provide means whereby the supply and mixing of two or more fluids may be accurately controlled.

In the accompanying drawings—

Figure 1 shows a side elevation, in partial section, of the device;

Figure 2 is a transverse section on the line 2—2 of Figure 1;

Figure 3 is a horizontal section on the line 3—3 of Figure 1.

My fluid regulator consists of a receptacle 10 closed on all sides and having an inlet port 11 connected with a feed line 12 and an outlet port 13 connected with the pipe line 14. The outlet port 13 is preferably formed in a valve housing 15 containing a ball 16 which is pressed by a coiled spring 17 into its seat 18 formed at the upper end of the housing. In axial alinement with the housing 15, I provide a plunger 19 which is carried in a bearing 20 forming a cover for the receptacle 10. Upon this bearing 20 is pivoted a lever 21 which is provided with a flat head 22 having a cam 23 on its under side adapted to contact with the upper end of the plunger 19. At times it is advantageous to provide several chambers 24 in the receptacle 10 which, as best seen in Figures 2 and 3, are arranged in pairs side by side. In such a case, an outlet port and valve are furnished for each chamber, and a cam 23 provided for each of the plungers 19. These chambers 24 might be partitioned off, as at 25, in which case an aperture 26 connects the one side of the chamber with the other, as seen in Figure 1.

An auxiliary cistern 27 is provided for each of the pipe lines 14 and secured thereto by means of a bracket 28. A short pipe 29 connects the bottom of the cistern 27 with its pipe line 14 so that, when the fluid in the pipe line reaches a certain height, the overflow will run into the cistern 27.

In this cistern which is covered by a lid 30 is provided a float 31 which has attached thereto a piston rod 32. This rod reaches upwardly through the lid 30 and has adjustable connection with an oscillating bridge 33. The end of the piston rod 32 is threaded in order to carry a nut 34 abutting on the under side of the bridge 33. By this means, the relative position between the bridge 33 and the float 31 may be adjusted. The bridge 33 has a downwardly reaching arm 35 which is pivotally connected with a bracket 36 on the receptacle 10, the bracket also forming a guide for the piston rod 32.

The inlet port 11 is formed in a valve housing 37 threaded in the bottom of the receptacle 10 and forming a seat for the ball valve 38. On top of this ball valve is supported a plunger 39 guided in the top of the receptacle, as at 40, and of sufficient length to reach up under the inwardly projecting arm 41 of the bridge 33. In this manner, the plunger 39 will press the valve ball 38 downwardly into its seat against the fluid pressure in the feed line 12 when the fluid in the cistern 27 rises sufficiently to lift the float 31 and swing the oscillating bridge 33 downwardly against the plunger 39.

On a lever 42 pivoted in the receptacle 10, as at 43, is secured a second float 44 and this lever 42 has operative connection, as at 45, with the plunger 39 so that, when the float 44 is lifted by the rising fluid in the receptacle 10, it will act upon the plunger 39 to press it downwardly and seat the valve ball 38 and in this manner shut off the supply of fluid into the receptacle.

On the upper face of the lever head 22 may be provided graduations intended to be read off against an indicator 46 secured on top of the receptacle, as seen in Figure 2. By this means, the operator will be guided in opening and closing the outlet port 13 which regulates the supply of fluid into the pipe line 14.

The operation of the device is as follows: The lever 21 is first turned to open the outlet port 13 by means of the cam 23 pressing the plunger 19 against the valve ball 16 so that the latter will be unseated.

In case there should be no fluid in the receptacle 10, the float 44 will stand in an inclined position, as will be understood, and in that case the plunger 39 will be raised to release the valve ball 38 and the latter will then be lifted out of its seat by means of the fluid pressure in the feed line 12. The fluid will now enter through the inlet port 11 and commence to fill the receptacle 10 and will pass through the aperture 26 and through the outlet port 13 into the pipe line 14. As the receptacle gradually fills, the fluid will ultimately reach the level, indicated by line 50, in the receptacle when the float 44 will take the horizontal position shown in Figure 1. In this position, the float compels the plunger 39 to descend against the valve ball 38 which, in this manner, will be seated and cut off the supply of fluid from the feed line 12. When the fluid again begins to fall below the line 50 in the receptacle, the float 44 will fall and, as a consequence, raise the plunger 39 when the force of the fluid in the feed line 12 will lift the valve ball 38 out of its seat and refilling of the receptacle commences.

Should now the supply of fluid be greater than the consumption, the fluid will not flow away rapidly enough through the pipe line 14, but will rise therein and, when it has reached a certain level, begin to empty into the cistern 27. The float 31 will now begin to rise and in doing so push against the bridge 33, the left arm 41 of which will then compel the plunger 39 to descend against the valve ball 38 and close the inlet port 11. In this manner, the supply of the fluid is always automatically regulated by the consumption thereof and no waste can occur.

In case the fluid supplied by the feed line 12 has to be mixed with atmospheric air, the openings 51 are provided in the casing beneath the receptacle adjacent the outlet port 13.

It will be evident that different kinds of fluids may be admitted to one and the same pipe line to be mixed therein if supplied through individual feed lines 12 entering the separate compartments 24 provided in the receptacle 10. In case the mixture should be made of unequal amounts of the different fluids contained in the mixture, this may be easily accomplished by supplying cams 23 of different heights or construction which, however, may be simultaneously operated by the lever 21.

Having thus described the invention, what is claimed as new is:

1. In a fluid regulator, a receptacle provided in its bottom with an inlet port and an outlet port, a manually operable valve for the outlet port, a valve for the inlet port, the inlet port having direct connection with a feed line and the outlet port having direct connection with a pipe line, float-controlled means within the receptacle for closing the inlet valve, a cistern closed to the receptacle and the feed line and having a conduit in communication with the pipe line, a float in the cistern, and connections between the float and the inlet valve to close said valve under pressure of liquid in the cistern.

2. In a fluid regulator, a fluid receptacle having inlet and outlet ports each provided with a valve, a pipe line into which the outlet port discharges, means for closing the inlet valve comprising a closed cistern having a conduit in communication with the pipe line, a float in the cistern, and elements connecting the float with the inlet valve whereby the inlet valve is adapted to be closed upon the float rising in the cistern actuated by the back flow of the fluid into the cistern caused by the consumption of the fluid in the pipe line being smaller than the discharge into it from the outlet port.

3. In a fluid regulator, a receptacle having inlet and outlet ports each provided with a ball valve, a pipe line into which the outlet port discharges, means for closing the inlet valve comprising a closed cistern having a conduit in communication with the pipe line, a float in the cistern, a plunger in the receptacle mounted in axial alinement with the inlet valve and contacting with its ball, a lever fulcrumed on the receptacle and contacting with the plunger, and an actuating rod connecting the lever with the float whereby the inlet valve is adapted to be closed upon the float rising in the cistern actuated by the back flow of the fluid into the cistern caused by the consumption of the fluid in the pipe line being smaller than the discharge into it from the outlet port.

In testimony whereof I affix my signature.

WILLIAM L. HIGGINS. [L. S.]